(No Model.) 3 Sheets—Sheet 1.
L. S. CAMPBELL.
MACHINE FOR HUSKING GREEN CORN.
No. 535,192. Patented Mar. 5, 1895.
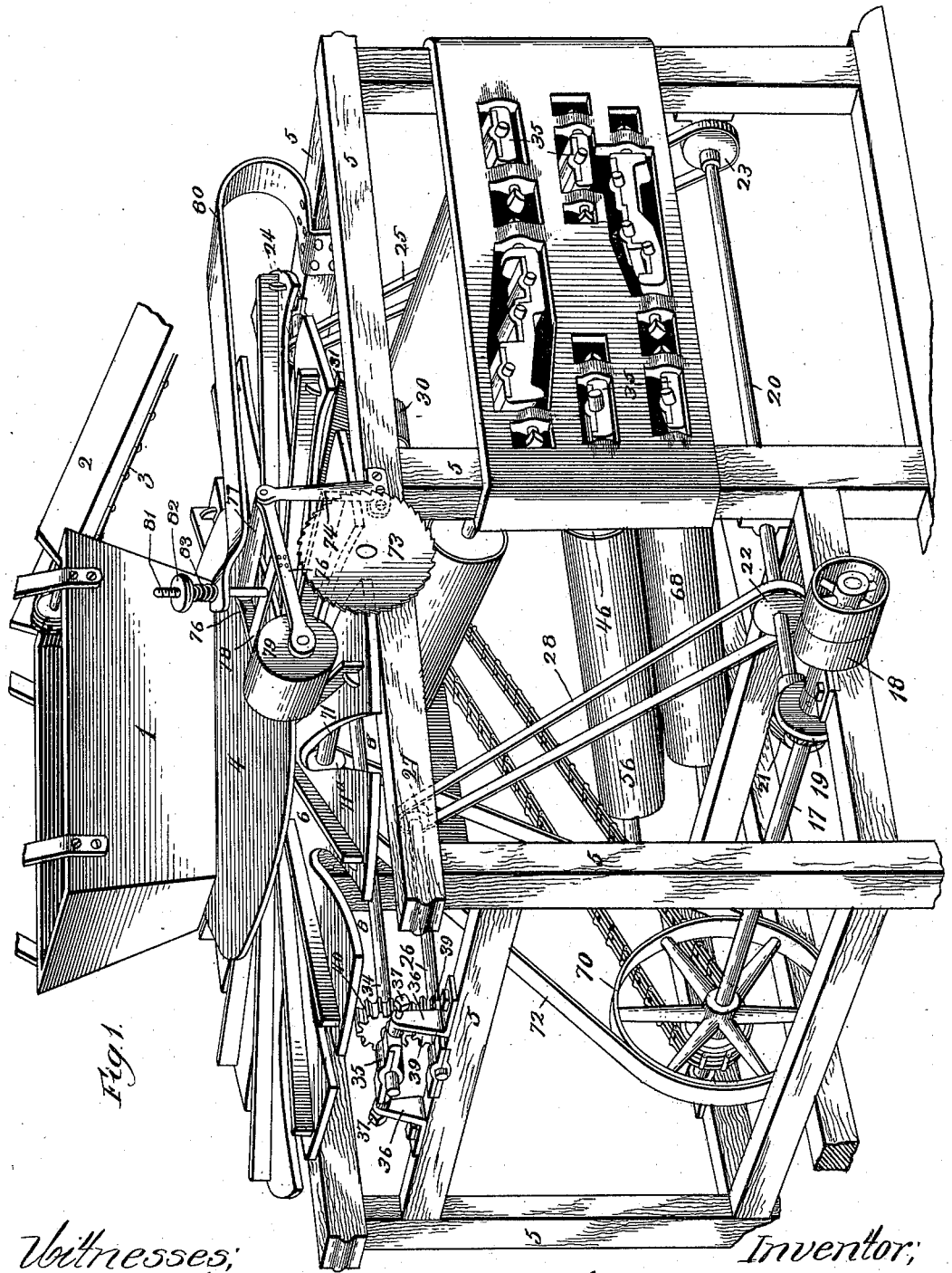
Witnesses:
Clifford N. White,
Julia M. Bristol.
Inventor:
Lawrence S. Campbell
by Bond, Adams, Pickard & Jackson
Atty's (No Model.) 3 Sheets—Sheet 2.
L. S. CAMPBELL.
MACHINE FOR HUSKING GREEN CORN.
No. 535,192. Patented Mar. 5, 1895.
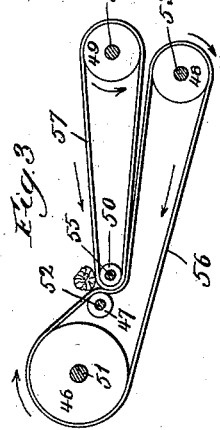
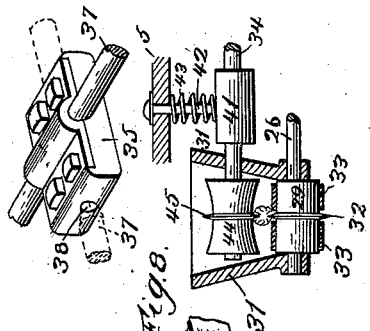
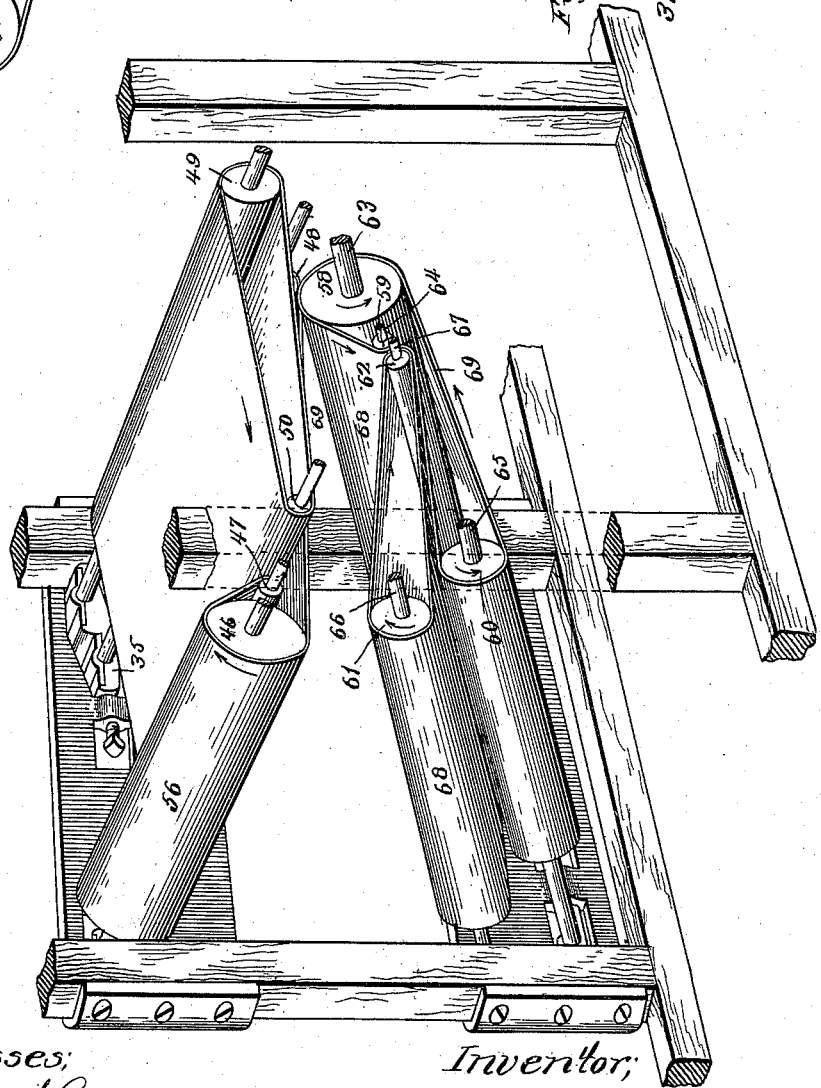
Witnesses:
Clifford N. White,
Julia M. Bristol
Inventor:
Lawrence S. Campbell
By Bond, Adams, Pickard & Jackson
Atty's (No Model.) 3 Sheets—Sheet 3.
L. S. CAMPBELL.
MACHINE FOR HUSKING GREEN CORN.
No. 535,192. Patented Mar. 5, 1895.
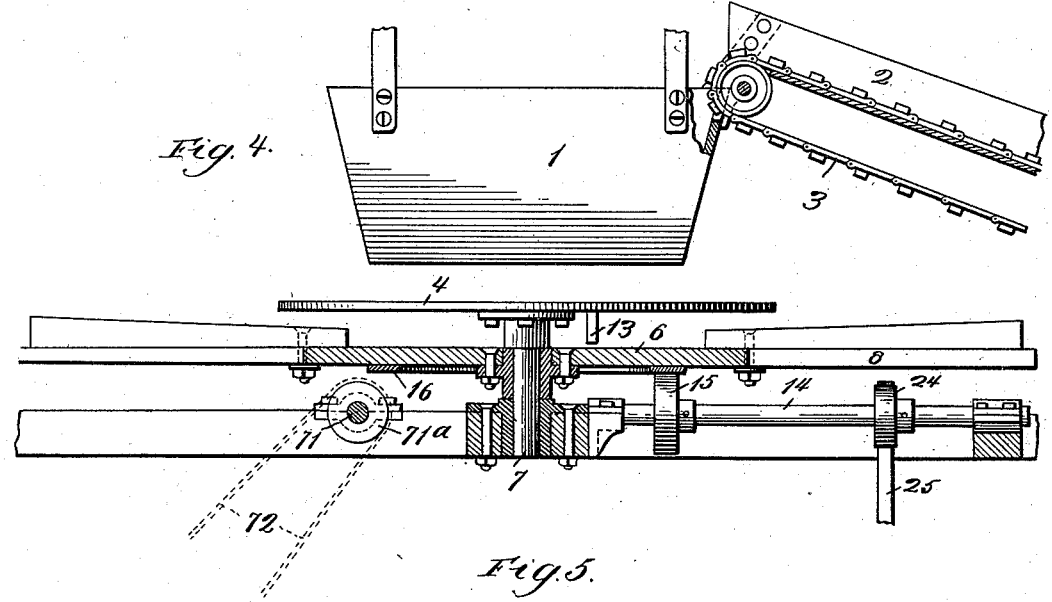
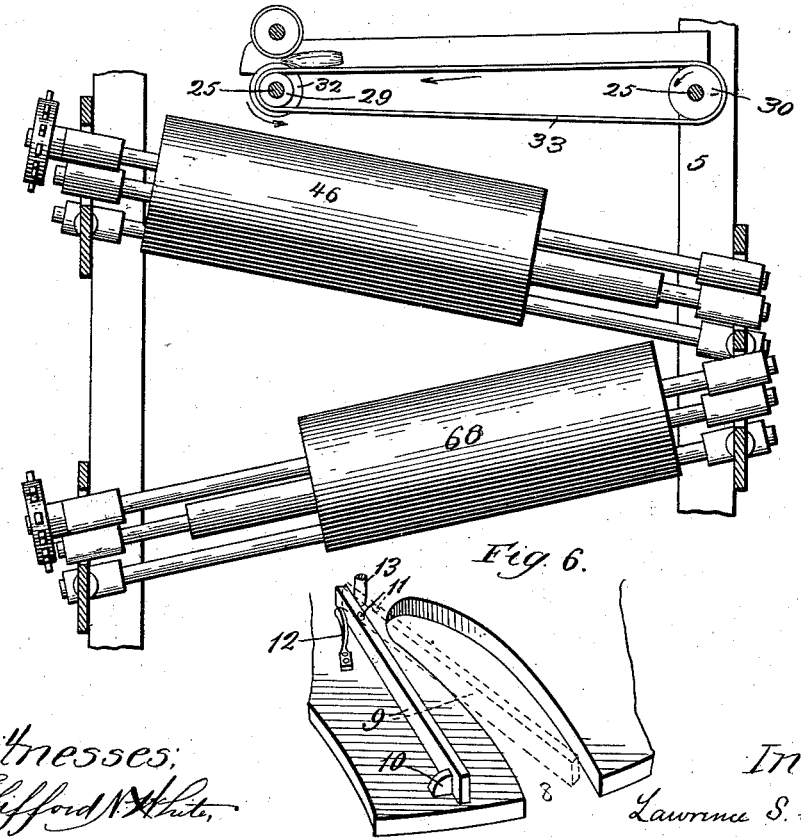
Witnesses:
Clifford N. White
Julia M. Bristol
Inventor:
Lawrence S. Campbell
by Bond, Adams, Pickard & Jackson
Atty's

UNITED STATES PATENT OFFICE.

LAWRENCE S. CAMPBELL, OF WAVERLY, IOWA, ASSIGNOR TO HIMSELF AND ISAAC WOODRING, OF SAME PLACE.

MACHINE FOR HUSKING GREEN CORN.

SPECIFICATION forming part of Letters Patent No. 535,192, dated March 5, 1895.

Application filed March 3, 1894. Serial No. 502,288. (No model.)

*To all whom it may concern:*

Be it known that I, LAWRENCE S. CAMPBELL, a citizen of the United States, residing at Waverly, in the county of Bremer and State of Iowa, have invented certain new and useful Improvements in Machines for Husking Green Corn, of which the following is a specification, reference being had to the accompanying drawings, in which—

Figure 1 is a perspective view of my machine. Fig. 2 is a perspective view of the rollers and belts of my machine, by which the corn is stripped of the husk, with parts of the side removed. Fig. 3 is a detail, being a diagram showing the rollers and belts. Fig. 4 is a detail, being a view of the hopper and revolving table, partly in longitudinal section. Fig. 5 is a detail, being an end view of the rollers, with a number of parts removed. Fig. 6 is a detail, being a view of a portion of the revolving table, showing the arms by which the ear of corn is delivered from the table upon the husking device. Fig. 7 is a detail, showing the journal box supporting one end of the shaft upon which one of the slitting knives is mounted; and Fig. 8 is a detail, being an end view of the rollers carrying the slitting knives, and showing the method in which the inner end of the arm carrying the upper roller with the slitting knife attached is supported.

My invention relates to machines for husking green corn, and its object is to provide devices by which green corn may be stripped of the husks and silk rapidly and cleanly.

Heretofore it has been the practice in establishments in which green corn is put up and canned to strip the husks and silk from the green corn by hand, entailing considerable expense; and it is the object of my invention to provide devices by which the corn may be husked by machinery instead of by hand. I attain these objects as hereinafter specified and as illustrated in the drawings.

That which I regard as new will be set forth in the claims.

In the drawings,—1 indicates a hopper, which is suspended above the machine in any appropriate manner.

2 indicates a carrier, provided with an endless belt 3, into which the green corn is placed, and carried into the hopper 1.

4 indicates a stationary table, which is mounted above a framework 5, as is best shown in Figs. 1 and 4.

6 indicates a revolving table, which is mounted in the framework 5 of the machine, and rotates around a pin 7 secured in said framework, as is best shown in Fig. 4. The table 6 is provided with a number of openings 8, which extend from the circumference a suitable distance toward the center of the revolving table 6.

9 indicates arms, which are pivoted at a point near their inner ends upon the upper surface of the revolving table 6, one behind each opening 8, as is best shown in Fig. 6.

10 indicates stops, which are secured to the upper surface of the revolving table 6 behind the arms 9, at a suitable distance behind the rear edges of the openings 8. The arms 9 are pivoted, as aforesaid, upon pivots 11, which are secured to the upper surface of the revolving table 6, as is best shown in Fig. 6.

12 indicates springs, which are secured to the upper surface of the revolving table 6, and bear against the ends of the arms 9 between the pivots 11 and the center of the revolving table, operating to hold the arms 9 back against the stops 10.

13 indicates a pin, which is secured to the under surface of the stationary table 4 at a suitable point, and operating to come in contact successively with the inner ends of the arms 9 as the revolving table 6 rotates, forcing the outer ends forward over the openings 8, as is indicated by dotted lines in Fig. 6. As the revolving table 6 continues its rotation the inner ends of the arms 9 pass beyond the pin 13 and are freed from it, the springs 12 thereupon throwing the arms 9 back against the stops 10.

14 indicates a shaft journaled in the framework 5, as is best shown in Fig. 4, and driven by the power that drives the machine, as hereinafter more fully described. 15 indicates a friction wheel, which is secured upon the shaft 14 near its inner end, as is best shown in Fig. 4. 16 indicates a circular track, secured to the under surface of the revolving table 6 and adapted to bear by friction upon the periphery of the friction wheel 15. As the shaft 14, and with it the friction wheel 15, is rotated, the friction wheel 15 bearing against the circular track 16 operates to rotate the revolving table 6.

17 indicates a shaft journaled in the framework 5, and having driving pulleys 18 at its outer end, by which the power is communicated from the engine or other power to the machine.

19 indicates a bevel gear secured to the driving shaft 17.

20 indicates a shaft, which is journaled in the framework 5, and carries upon one end a bevel gear 21 which meshes with the bevel gear 19.

22—23 indicate driving pulleys, which are mounted upon the shaft 20.

24 indicates a pulley mounted upon the shaft 14, and driven by a belt 25, (see Figs. 1 and 4) passing around the pulleys 23 and 24.

26 indicates a shaft, which is mounted in the framework 5 and is provided with a pulley 27 near its outer end. The pulley 27 is driven by a belt 28 passing around the pulleys 22 and 27, rotating the shaft 26.

29 indicates a roller of suitable width, which is mounted upon the inner end of the shaft 26, as is best shown in Figs. 5 and 8.

30 indicates a roller, which is journaled upon the framework 5, as is best shown in Fig. 5.

31 indicates a trough, which is secured to the framework 5, and which is shown in cross section in Fig. 8. The inner end of the shaft 26 is journaled in the lower portion of the trough 31, as is best shown in Fig. 8.

32 indicates a circular slitting knife, which is mounted upon the roller 29, as is best shown in Fig. 8.

33 indicates belts which pass around the rollers 29 and 30, the slitting knife 32 upon the roller 29 coming between the two belts, the belts 33 forming the bottom of the trough 31, as is best shown in Fig. 8.

34 indicates a shaft, the outer end of which is journaled in a journal box 35. (See Fig. 1.)

36 indicates standards, which are secured to the framework 5, as is best shown in Fig. 1.

37 indicates bearing pins, which are provided with screw threads adapted to screw into suitable threaded openings in the upper ends of the standards 36. The bearing pins 37 are somewhat pointed at their inner ends, and are adapted to bear in suitable depressions 38 in the ends of the journal box 35, as is best shown in Fig. 7, permitting the journal box to rock upon the bearing pins 37 on an axis extending from one bearing pin to the other.

39 indicates a gear wheel mounted upon the outer end of the shaft 26, and 40 indicates a gear wheel mounted near the outer end of the shaft 34 adapted to mesh with the gear wheel 39. As the shaft 26 is rotated the rotation is communicated by means of the gears 39 and 40 to the shaft 34. The inner end of the shaft 34 is mounted in a bearing box 41, as is best shown in Fig. 8. The bearing box 41 is secured to a pin 42, which passes upward through the framework 5.

43 indicates a spiral spring which surrounds the pin 42, bearing against the framework 5 and upon the upper surface of the bearing box 41, permitting the inner end of the shaft 34 to rise and fall vertically.

44 indicates a concave roller, which is secured upon the inner end of the shaft 34, as is best shown in Fig. 8, and lying within the trough 31.

45 indicates a circular slitting knife, mounted upon the middle of the concave roller 44 above the slitting knife 32.

46—47—48—49—50 indicate rollers, which are mounted respectively upon shafts 51—52—53—54—55 journaled in the framework 5 of the machine, as is best shown in Fig. 5, below the trough 31. The ends of the shafts 51—52—53—54—55 which are nearest the rollers 29 and 30 are higher than their other ends, causing the rollers to slope downward toward the side of the machine which is nearest in Fig. 1, as is shown in Figs. 1, 2 and 5. The roller 50 is not upon the same plane as the guide roller 47, but is located a little below it, as is best shown in Fig. 3, for reasons which will be hereinafter explained.

56 indicates a wide belt of canvas, rubber belting, or other suitable material, which passes around the rollers 46 and 48 and over the roller 47, as is best shown in Figs. 2 and 3.

57 indicates a wide belt of canvas, rubber belting, or other suitable material, which passes around the rollers 49 and 50, as is best shown in Figs. 2 and 3. The rollers are driven by any suitable means from the driving shaft 17, so as to rotate in the directions indicated by the arrows in Fig. 3, carrying their respective belts 56 and 57 in the directions indicated by the arrows in Fig. 3.

58—59—60—61—62 indicate rollers mounted upon shafts 63—64—65—66—67 respectively, which are journaled in the framework 5 below the rollers 46 to 50 inclusive. The rollers 58 to 62 inclusive form a set of rollers similar to the rollers 46 to 50 inclusive, and are journaled in the framework in the same manner except that they slope downward in an opposite direction to that in which the rollers 46 to 50 inclusive slope, as is best shown in Figs. 2 and 5, and are driven from the driving shaft 17 in any suitable manner so as to rotate in the directions indicated by the arrows in Fig. 2. The roller 62 is not upon the same plane as the roller 59, but is located somewhat below it, corresponding to the rollers 50 and 47, for reasons which will be hereinafter given.

68 indicates a wide belt of canvas, rubber belting, or other suitable material, which passes around the rollers 61 and 62, moving in the direction of the arrows shown in Fig. 2.

69 indicates a wide belt of canvas, rubber belting, or other suitable material, which passes around the rollers 58 and 60 and over the roller 49, moving as the rollers 58 and 60 rotate, in the directions indicated by the arrows in Fig. 2.

70 (see Fig. 1) indicates a driving pulley, which is mounted upon the driving shaft 17.

71 (see Fig. 1) indicates a shaft which is journaled in the framework 5.

71ª indicates a pulley mounted upon the shaft 71, on the same vertical plane as the driving pulley 70.

72 indicates a belt passing around the driving pulley 70 and around the pulley 71ª, causing the shaft 71 to rotate.

73 indicates a circular saw, which is mounted upon the outer end of the shaft 71, as is best shown in Fig. 1, outside the framework 5, in such a position as to clear the periphery of the revolving table 6.

74 indicates an upright support, rigidly secured to the framework 5, as is best shown in Fig. 1. A frame, consisting of side pieces 76 and cross pieces 77 and 78, is pivotally mounted by means of the cross piece 77 upon the upright 74.

79 indicates a roller of suitable weight, which is journaled in the ends of the side pieces 76, as is best shown in Fig. 1.

80 indicates an arm, which is secured to the framework 5 and is bent over so that its free end may come above the roller frame.

81 indicates an upright pin, which is secured to the cross piece 78 of the roller frame, and passes upward through a suitable opening in the free end of the arm 80. The upper end of the upright pin 81 is threaded, and provided with a thumb nut 82.

83 indicates a spiral spring, which surrounds the upright pin 81, and bears against the upper surface of the arm 80 and the under surface of the thumb nut 82.

By means of the thumb nut 82 the roller frame carrying the roller 79 is adjusted at such a height that the roller 79 will clear the arms 9 of the revolving table 6 as the table rotates.

The operation of my machine is as follows: The corn is fed into the carrier 2, from which, by means of the carrier belt 3, it is delivered into the hopper 1, falling upon the stationary table 4. As the ears of corn fall upon the stationary table 4 they are removed from the table by workmen, whose number will depend upon the speed with which the machine is driven, and placed upon the revolving table 6, one ear at a time. The ear of corn is placed upon the revolving table so that it lies against the arms 9 with the butt of the ear outward, and extending a suitable distance beyond the periphery of the revolving table 6. The ear of corn is thus carried by the rotation of the table 6 under the roller 79, which operates to hold it firmly in place against the arm 9 while the butt of the ear is carried against the circular saw 73. The circular saw 73 cuts through the butt of the ear of corn at the base of the ear so as to sever the stalk and husks and loosen the lower ends of the husk from the ear. After passing beyond the saw, the inner ends of the arms 9 come in contact with the pin 13, which is so located as to impinge upon the inner ends of the arms 9 after they have passed beyond the saw. The outer ends of the arms 9 are thus moved around over the openings 8 in the revolving table 6, as is indicated by dotted lines in Fig. 6, carrying the ears of corn with them. The ears of corn thus drop successively through the openings in the revolving table into the trough 31. The pulleys 29 and 30 being rotated in the direction indicated by the arrows in Fig. 5, the belts 33 are carried in the direction indicated by the arrows in the same figure, thus moving the ears of corn downward between the rollers 29 and 44. As they pass between the rollers 29 and 44 the knives 32 and 45 slit the husks longitudinally through to the ear of corn, the upper roller 44 rising and falling to accommodate itself to the size of the ear, as has been heretofore described. The ears of corn, with the husks thus slit longitudinally, after passing through the rollers 29 and 44, are dropped upon the belt 57, and are carried by the belt in the direction indicated by the arrow in Fig. 3 until they rest upon the belting above the roller 50 and in the angle formed by the belts 56 and 57. The roller 50 being below the guide roller 47 the ear of corn rests above the roller 50, as is shown in Fig. 3, and the roller 50 rotating rapidly in the direction indicated by the arrow in Fig. 3, the weight of the ear of corn resting above the roller 50 causes the ear to be rotated about its longitudinal axis in the angle formed by the belts 56 and 57 in the direction indicated by the arrow in Fig. 3. This rotation of the ear of corn, together with the friction of the belts as the ear rests in the angle between the belts 56 and 57, causes the ear to be rapidly stripped of the husk and silk, the ear of corn in the meanwhile sliding down the incline of the rollers as it is stripped. When the ears of corn reach the edge of the belting they fall upon the belting 68, and are carried by it into the angle between the belts 68 and 69, resting above the roller 62, which is, as has been before stated, located a little below the roller 59. The weight of the ear of corn resting above the roller 62 causes the ear to rotate, as heretofore described, and the friction caused by the belts 68 and 69 as the ear of corn rests in the angle between them and rotates, strips the ear of any portion of husk and silk which may remain after passing from the upper series of rollers. The ears of corn slide down the incline upon the lower set of rollers, and as they pass off the belt husked and stripped of silk, they are dropped into any suitable receptacle and are carried away. The husks and silk, after being stripped from the ears, are carried between the belts 56 and 57 and between the belts 68 and 69, and pass out at the end between the rollers 48, 49, 60 and 61 respectively, out of the machine, where they may be gathered in any suitable receptacle and removed.

I have shown a feeding belt with a hopper and fixed table for a large machine; but it is evident that these parts of the machine may be modified or dispensed with, as the corn may be taken from a table or basket by the attendant, and be placed therefrom directly upon the rotating table.

That which I claim as my invention, and desire to secure by Letters Patent, is—

1. In a corn-husker, the combination with two pairs of rollers, mechanism for driving the same, and two oppositely moving belts carried by said rollers, one of said belts being located above and adjusted to meet the other belt at an angle, of a guide roller arranged against the inner side of the lower belt and beside the inner roller of said upper pair and adapted to lift the lower belt above the axis of said inner roller, substantially as described.

2. In a corn-husker, the combination with a lower pair of inclined rollers, a second pair of rollers located above the plane of said lower pair of rollers, and mechanism for driving said rollers, of a belt carried by said lower rollers, a second belt carried by said upper rollers, and a guide roller arranged against the inner side of the lower belt and beside the inner roller of said upper pair and adapted to lift the lower belt above the axis of said inner roller, substantially as described.

3. In a corn-husker, the combination with a lower pair of inclined rollers, an upper pair of inclined rollers, and mechanism for driving the same, of two oppositely moving belts carried one by each pair of rollers, the upper belt being adjusted to meet the lower belt at an angle at a point between the lower rollers, a guide roller arranged against the inner side of said lower belt beyond the meeting point of said belts and adapted to raise said lower belt at its line of meeting with said upper belt, substantially as described.

4. In a corn-husker, the combination with a lower pair of inclined rollers, an upper pair of inclined rollers, and mechanism for driving the same, of two oppositely moving belts carried one by each pair of rollers, the upper belt being adjusted to meet the lower belt at an angle at a point between the lower rollers, and a guide roller arranged against the inner side of said lower belt beyond the meeting point of said belts and adapted to raise said lower belt at its line of meeting with said upper belt, whereby an ear of corn coming to said line of meeting of said belts will be caused to lie on said upper belt above the inner roller of said upper pair, and rotated thereby, substantially as described.

5. In a corn husker, the combination with rotary knives adapted to longitudinally slit the husks upon ears of corn, mechanism for driving said rotary knives, and mechanism adapted to deliver said ears of corn to said rotary knives, of inclined rollers, mechanism for driving the same, two oppositely moving belts carried by said rollers and adjusted to meet one another at an angle, and adapted to rotate an ear of corn lying in said angle, and mechanism adapted to deliver said slitted ears upon said belts, substantially as described.

6. In a corn husker, the combination with devices for severing the husks at the base of the ears, rotary knives adapted to longitudinally slit the husks upon the ears of corn, mechanism for driving said knives, and mechanism adapted to deliver the ears of corn after the husks are severed at the base to said rotary knives, of inclined rollers, mechanism for driving the same, two oppositely moving belts carried by said rollers and adjusted to meet one another at an angle, and adapted to rotate an ear of corn lying in said angle, and mechanism adapted to deliver said longitudinally slitted ears upon said belts, substantially as described.

7. In a corn husker, the combination with inclined rollers 44 and 50, a belt 57 carried by said inclined rollers, inclined rollers 46 and 48, a belt 56 carried by said rollers 46 and 48 and adjusted to meet said belt 57 at an angle, and mechanism for driving said rollers and moving said belts in opposite directions, of a roller 47 adjacent to and above said roller 50 and adapted to cause said belts to meet at an angle, whereby an ear of corn resting in said angle is rotated by the action of said roller 50, and mechanism adapted to deliver ears of corn upon said belt 57, substantially as described.

8. In a corn husker, the combination with devices adapted to sever the husks from an ear of corn at the base of said ear, devices for longitudinally slitting the husks upon said ear, and mechanism adapted to deliver said ears of corn after being severed at the base from the husks to said slitters, of inclined rollers 44 and 50, a belt 57 carried by said inclined rollers, inclined rollers 46 and 48, a belt 56 carried by said rollers 46 and 48 and adjusted to meet said belt 57 at an angle, mechanism for driving said rollers and moving said belts in opposite directions, a roller 47 adjacent to and above said roller 50 and adapted to cause said belts to meet at an angle, whereby an ear of corn resting in said angle is rotated by the action of said roller 50, and mechanism adapted to deliver ears of corn upon said belt 57, substantially as described.

9. In a corn-husker, the combination with a rotating table provided with radial openings, a saw adapted to sever the husks at the base of the ear as said table rotates, mechanism adapted to hold the ears upon said rotary table and against said saw, and to move said ears into said radial openings after said husks are severed, and mechanism for driving said table and said saw, of devices adapted to longitudinally slit the husks upon said ears after the husks are severed at the base, mechanism adapted to deliver said ears from said rotating table to said slitting devices, inclined rollers, mechanism for driving the same, and two oppositely moving belts carried by said rollers adjusted to meet one another at an angle and adapted to rotate an ear of corn lying in said angle, substantially as described.

10. In a corn husker, the combination with a rotary table provided with radial openings, arms pivoted upon said table and adapted to carry the ears of corn around on said rotary table as it revolves, a roller adapted to press an ear of corn upon said rotating table and against said arms, a saw adapted to sever the husks and stem at the base of said ear, and mechanism for driving said rotating table and saw, of a trip adapted to move said arms and throw said ears into said radial openings after being severed at the base, devices adapted to return said arms to their former position after being freed from said trip, mechanism adapted to strip the husks and silk from said ears, and mechanism for delivering said ears to said husking devices, substantially as described.

11. In a corn husker, the combination with a rotary table provided with radial openings, arms pivoted upon said table and adapted to carry the ears of corn around on said rotating table as it revolves, a roller adapted to press an ear of corn upon said rotating table and against said arms, a saw adapted to sever the husks and stem at the base of said ear, and mechanism for driving said rotating table and saw, of a trip adapted to move said arms and throw said ears into said radial openings after being severed at the base, devices adapted to longitudinally slit the husks upon said ears after said husks are severed at the base of the ear, mechanism for delivering said ears to said slitting devices, and mechanism adapted to strip the husks and silk from said ears after said husks are longitudinally slitted, substantially as described.

12. In a corn husker, the combination with a rotating table, a saw adapted to sever the husks at the base of the ears, and mechanism for holding said ears upon said rotating table and against said saw, of rollers provided with circular slitting knives adapted to longitudinally slit the husks upon said ears, devices adapted to deliver said ears after the husks are severed at their base to said slitting knives, mechanism for driving the same, and two oppositely moving belts carried by said rollers and adjusted to meet one another at an angle, and adapted to receive the ears of corn after passing from the slitting knives, substantially as described.

LAWRENCE S. CAMPBELL.

In presence of—
  J. Y. HAZLETT,
  JOHN M. HAZLETT.